United States Patent Office 2,942,002
Patented June 21, 1960

2,942,002

1 - (BETA - DIETHYLAMINOETHYL) - 5 - NITRO-BENZIMIDAZOLES, 2-SUBSTITUTED BY PYRIDYLMETHYL OR THIENYLMETHYL

Karl Hoffmann, Binningen, and Alfred Hunger, Jindrich Kebrle, and Alberto Rossi, Basel, Switzerland, assignors to Ciba Pharmaceutical Products Inc., Summit, N.J.

No Drawing. Filed June 19, 1958, Ser. No. 743,003

Claims priority, application Switzerland July 17, 1957

8 Claims. (Cl. 260—296)

The present invention relates to 1-(lower tertiary amino-lower alkyl)-benzimidazoles containing in the 2-position a pyridyl- or a thienyl-methyl radical and in the 5-position a nitro group, as well as to their salts. The invention relates more especially to benzimidazoles of the formula

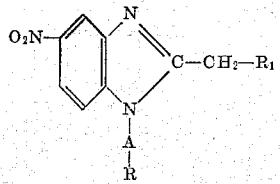

in which A represents a lower alkylene radical, more especially ethylene, and R represents a lower alkyleneimino group which may be interrupted by a hetero atom, such as a piperidino, pyrrolidino or morpholino group, and particularly a di-lower alkyl-amino group, above all the diethyl-amino group, and in which formula $R_1$ is a pyridyl or a thienyl radical which is unsubstituted or substituted by a halogen atom or a lower alkyl or a lower alkoxy group, and their salts.

The new compounds have very good analgesic action and have better pharmacological properties than comparable benzylimidazoles which makes them suitable as analgetics. Of special value, by virtue of their therapeutic properties, are the compounds of the formula

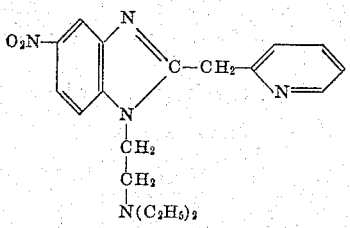

and

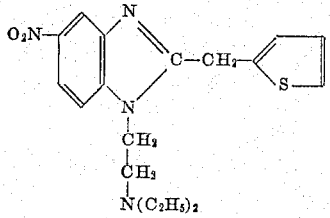

and their salts.

The new benzimidazoles are obtained by as such known methods. According to one method, for example, the lower tertiary amino-lower alkyl radical is introduced directly or in stages into the 1-position of a 5-nitro-2-pyridyl- or thienyl-methyl benzimidazole. Thus, a 5-nitro-2-pyridyl- or thienyl-methyl-benzimidazole can be reacted with a reactive ester of an alcohol of the formula

HO—A—R' in which A has the meaning defined above and R' represents a tertiary amino group or a radical convertible into such a group, e.g. a hydroxyl group, and in the resulting compound containing a radical convertible into the tertiary amino group said radical is so converted, thus, for example, a hydroxyl group by chlorination and subsequent reaction with a secondary amine. Reactive esters are more especially those of strong inorganic or organic acids, such as those of hydrohalic acids or organic sulfonic acids, such as para-toluene sulfonic acid. The introduction is preferably performed in the presence of a condensing agent, more especially one that is capable of forming metal salts with the 5-nitro-2-pyridyl- or thienyl-methyl benzimidazoles, such as alkali and alkaline earth metals, for example, sodium, lithium, calcium, their amides, hydrides, hydrocarbon compounds, alcoholates, oxides or hydroxides, e.g. sodamide, sodium hydride, lithium butyl, potassium phenyl, lithium phenyl, potassium tertiary butylate, potassium tertiary amylate, sodium ethylate, sodium oxide or sodium hydroxide, or with the use of the pre-formed metal salts of the benzimidazoles. This reaction generally yields a mixture of 5-nitro and 6-nitro derivatives which can be separated, for example, by crystallizing their bases or their salts.

According to another process for the manufacture of the new compounds the benzimidazole ring substituted in the 2-position by a pyridyl- or thienyl-methyl group and in the 5-position by a nitro group is formed by subjecting to ring closure a 2-(R''—NH)-5-nitraniline or a suitably N-substituted derivative thereof, R'' representing the above-mentioned group R—A— or a radical convertible thereinto, e.g. a halogeno-alkyl group. The radical convertible into the group R—A— is subsequently so converted, in the case of the halogeno-alkyl group, for example, by reaction with a secondary amine. Thus, for example, a 2-(tertiary-aminoalkylamino)-5-nitraniline can be subjected to direct or stepwise ring closure with a 2-pyridyl-acetic acid or a reactive functional derivative thereof, more especially an ester with an alcohol that is easy to split off, or with an imino-ether. Furthermore, the final products of the invention can also be obtained by condensation with a pyridyl- or thienyl-acetaldehyde or with a functional derivative thereof, instead of with a pyridyl- or thienyl-acetic acid, the product thus formed then being oxidised. Alternatively, the starting materials may be formed under the conditions employed in the aforementioned reactions; thus, for example, a 2-halogeno-5-nitro-thienyl-acetyl aniline can be subjected to ring closure with a tertiary aminoalkylamine to produce the corresponding benzimidazole derivative.

The reactions of the present process are performed in the presence or absence of diluents and/or condensing agents, if necessary at an elevated temperature, under atmospheric or superatmospheric pressure.

Substituents present in the pyridyl- or thienyl-methyl radical of the products of the invention can be replaced by other groups; thus, for example, a hydroxyl group may be converted into an etherified or esterified hydroxyl group, such as a lower alkoxy group, or a nitro group can be converted into an amino group and the latter into a lower alkoxy group or into a halogen atom.

According to the reaction conditions employed the new compounds are obtained in the form of their free bases or of their salts. From the salts the free bases can be made in as such known manner. The latter, by being reacted with acids suitable for the formation of therapeutically useful salts, can be converted into salts, for example salts of the hydrohalic acids, sulfuric acid, nitric acid, phosphoric acid, thiocyanic acid, acetic acid, propionic acid, oxalic acid, malonic acid, succinic acid, malic acid, methanesulfonic acid, ethanesulfonic acid, hydroxyethanesulfonic acid, benzenesulfonic or toluenesulfonic acid or of acids having therapeutic action.

The starting materials are known or can be made by known methods.

The invention further covers those modifications of the process in which the starting material is a compound obtained as an intermediate product at any stage of the process and the remaining stage or stages are carried out.

The new compounds can be used as medicaments, for example in the form of pharmaceutical preparations containing them or their salts in conjunction with a pharmaceutical organic or inorganic, solid or liquid excipient suitable for enteral, parenteral or topical application. The excipient is made from substances that do not react with the new compound such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, in the form of tablets, dragees, ointments, creams or in liquid form (solutions, suspensions or emulsions). They may be sterilized and/or contain assistants, such as preservatives, stabilizers, wetting agents or emulsifiers, salts for controlling the osmotic pressure or buffers. If desired, they may also contain further therapeutically useful substances.

The following examples illustrate the invention.

*Example 1*

A solution of 4 grams of 2-(β-diethylamino-ethylamino)-5-nitraniline hydrochloride in 55 cc. of glacial acetic acid is added to the thiophene-2-acetic acid imino ether hydrochloride obtained from 5.1 grams of thiophene-2-aceto-nitrile, 2.5 cc. of alcohol in 18 cc. of chloroform by introducing dry hydrochloric acid gas at —10° C., allowing the whole to stand for 10 hours at 25° C. and evaporating under diminished pressure. The mixture is then stirred for 20 hours at 40–45° C. The reaction mixture is evaporated under reduced pressure, and the residue taken up in aqueous hydrochloric acid, and the acid solution is washed with chloroform, rendered alkaline with ammonia solution, extracted with chloroform, and the chloroform extract is washed with sodium carbonate solution, dried with magnesium sulfate and evaporated.

The resulting crude 1-(β-diethyl-aminoethyl)-2-(2'-thienylmethyl)-5-nitro-benzimidazole is converted into its hydrochloride (melting at 198° C.) by dissolution in ethanol and addition of one equivalent of ethanolic hydrochloric acid.

*Example 2*

20 grams of 2-(β-diethylamino-ethylamino)-5-nitraniline and 20 grams of 2-pyridyl-acetic acid ethyl ester are heated for 4½ hours at 180–190° C. while distilling off the alcohol formed. The reaction mass solidifies upon cooling; it is recrystallized from ethyl acetate; the resulting 1-(β-diethyl-aminoethyl)-2-(2'-pyridylmethyl)-5-nitrobenzimidazole melts at 98–100° C.

Dissolution of this compound in ethanol and addition of one equivalent of ethanolic hydrochloric acid yields the mono-hydrochloride in the form of colorless crystals melting at 198–200° C.

What is claimed is:

1. 1-(β-diethylaminoethyl)-5-nitro-benzimidazole, containing in 2-position a substituent selected from the group consisting of pyridyl-methyl, halogeno-pyridyl-methyl, lower alkylpyridyl-methyl, lower alkoxy-pyridyl-methyl, thienyl-methyl, halogeno-thienyl-methyl, lower alkyl-thienyl-methyl and lower alkoxy-thienyl-methyl.

2. Therapeutically useful acid addition salts of the compounds of claim 1.

3. 1 - (β - diethylamino - ethyl) - 2 - (2' - thienyl-methyl)-5-nitro-benzimidazole.

4. 1 - (β - diethylamino - ethyl) - 2 - (2' - pyridyl-methyl)-5-nitro-benzimidazole.

5. Benzimidazoles of the formula

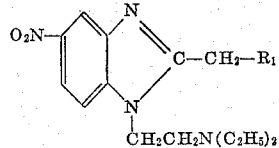

in which $R_1$ stands for pyridyl.

6. Benzimidazoles of the formula

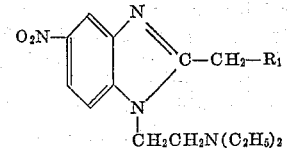

in which $R_1$ stands for thienyl.

7. The therapeutically acceptable acid addition salts of 1-(β-diethylaminoethyl)-2-(2'-pyridyl)-5-nitro-benzimidazole.

8. The therapeutically acceptable acid addition salts of 1 - (β - diethylaminoethyl) - 2 - (2' - thienyl)-5-nitro-benzimidazole.

No references cited.